(12) United States Patent
Larsson

(10) Patent No.: US 9,157,554 B2
(45) Date of Patent: Oct. 13, 2015

(54) BOLTLESS LOCKING ARRANGEMENT

(75) Inventor: Johan Larsson, Årjäng (SE)

(73) Assignee: AKER SUBSEA AS, Lysaker (NO)

( * ) Notice: Subject to any disclaimer, the term of this patent is extended or adjusted under 35 U.S.C. 154(b) by 37 days.

(21) Appl. No.: 13/992,274

(22) PCT Filed: Dec. 7, 2011

(86) PCT No.: PCT/NO2011/000338
§ 371 (c)(1),
(2), (4) Date: Jun. 7, 2013

(87) PCT Pub. No.: WO2012/078049
PCT Pub. Date: Jun. 14, 2012

(65) Prior Publication Data
US 2013/0264818 A1    Oct. 10, 2013

(30) Foreign Application Priority Data
Dec. 8, 2010  (NO) .................................. 20101713

(51) Int. Cl.
F16L 5/00 (2006.01)
F16L 1/26 (2006.01)
F16L 5/12 (2006.01)

(52) U.S. Cl.
CPC ... F16L 5/00 (2013.01); F16L 1/26 (2013.01); F16L 5/12 (2013.01)

(58) Field of Classification Search
USPC ........... 285/139.1, 139.2, 139.3, 142.1, 136.1
See application file for complete search history.

(56) References Cited

U.S. PATENT DOCUMENTS

| 803,687 | A | * | 11/1905 | Grotewohl | 285/139.1 |
| 1,755,104 | A | | 4/1930 | Deierlein | |
| 3,206,232 | A | * | 9/1965 | Varhanik et al. | 285/139.2 |
| 3,336,055 | A | * | 8/1967 | Pall et al. | 285/136.1 |
| 3,545,793 | A | * | 12/1970 | Graffy | 285/142.1 |
| 4,429,655 | A | * | 2/1984 | Tang | 285/136.1 |
| 4,894,966 | A | * | 1/1990 | Bailey et al. | 285/136.1 |
| 5,505,499 | A | * | 4/1996 | Wallbank | 285/139.1 |
| 5,988,698 | A | * | 11/1999 | Bravo et al. | 285/139.2 |
| 6,145,891 | A | * | 11/2000 | Youngs | 285/139.1 |
| 6,592,127 | B1 | * | 7/2003 | Flower et al. | 285/136.1 |
| 6,676,168 | B2 | * | 1/2004 | McAliley | 285/139.2 |
| 6,681,894 | B1 | * | 1/2004 | Fanguy | 182/113 |
| 7,108,290 | B2 | * | 9/2006 | Nansen et al. | 285/139.1 |
| 7,527,299 | B1 | * | 5/2009 | Collier | 285/139.3 |
| 2007/0013188 | A1 | | 1/2007 | Dallas et al. | |

* cited by examiner

Primary Examiner — David E Bochna
(74) Attorney, Agent, or Firm — Birch, Stewart, Kolasch & Birch, LLP

(57) ABSTRACT

A "boltless" locking arrangement for secure attachment of a boss to a fixed structural part is shown. The boss has a central axis and is extending substantially perpendicular to the plane of the structural part when the parts are assembled. The arrangement includes two substantially radially extending, when viewed relative to the central axis, action surfaces provided in the external surface of the boss, and at least one annular plate configured body made up by individual segments. The at least one annular plate configured body is at its radially inner, but external portion designed to co-operate, or engage with, at least one of the respective two action surfaces, and at its radially outer, but internal portion and on opposite side, is abutting the fixed structural part.

15 Claims, 3 Drawing Sheets

SECTION A-A

DETAIL B

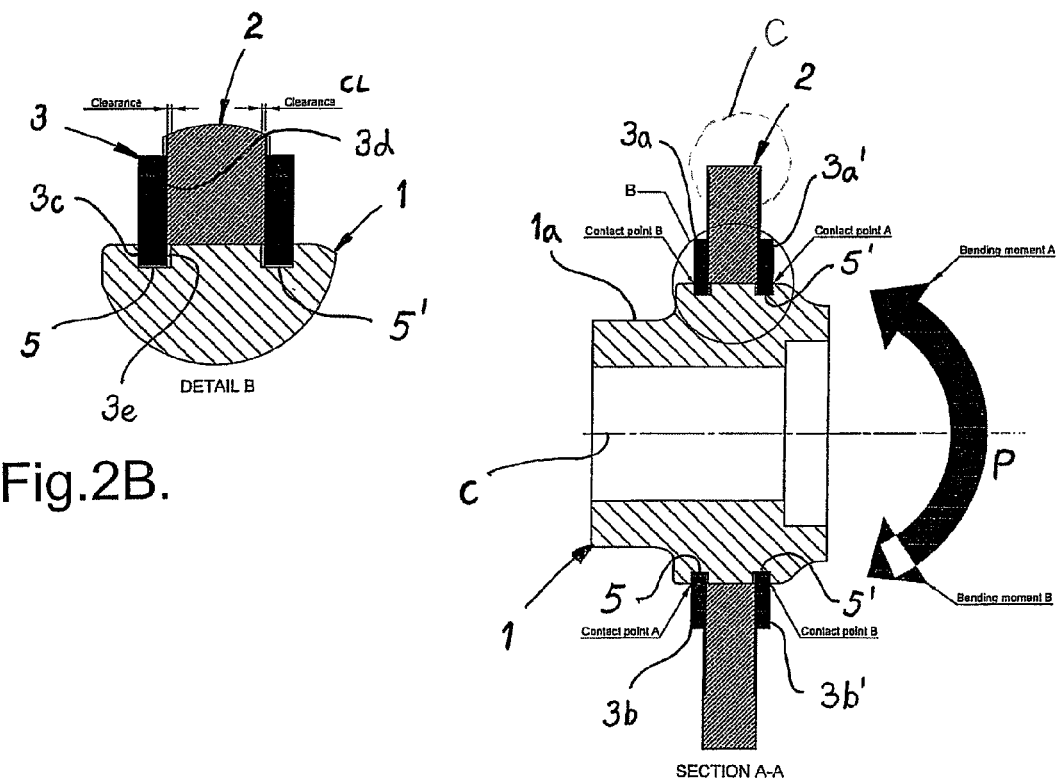
Fig.2B.
Fig.2A.
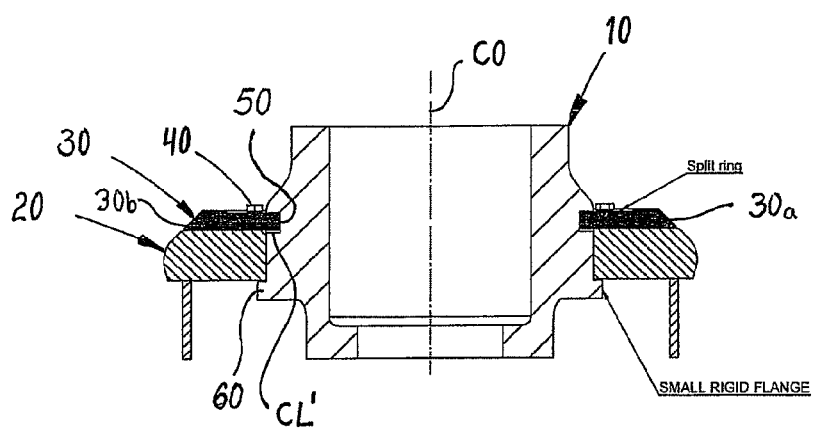
Fig.3.

DETAIL C

BOLTLESS LOCKING ARRANGEMENT

BACKGROUND OF THE INVENTION

1. Field of the Invention

The present invention relates to a locking arrangement for secure attachment of a boss to a fixed structural part without the use of fixation bolts, which boss has a central axis extending substantially perpendicular to the plane of the structural part when the parts are assembled.

2. Description of Background Art

Sometimes, structural parts that releasable retain a pipe boss are subjected to bending forces that are so high that the pipe boss is torn off even if it is secured by thick flanges and high strength bolts that are closely placed side by side within a bolt circle. This is in particular true in pipeline installations located on the seabed, i.e. pipes of relatively large dimensions, which are connected to a pipe stub or a pipe boss and are subjected to extreme bending moments.

Traditionally, a pipe boss of the type in question, is designed with an integrated flange, i.e. that it is made in one piece with the pipe stub itself and forms the one end of the pipe stub and has fixation holes arranged in a bolt circle. The pipe boss is in turn fixed to a plate part, which constitutes a part of a subsea structure, for example a connector part or an outboard hub. Therefore the plate part has a circular hole, or opening, formed therein for receipt, support and lead through of the pipe stub itself. Around this opening a number of holes are drilled and tapped and the holes align and correspond with the number of bolt holes in the flange. By mounting the bolts through the holes in the flange, entering them in the tapped holes and tighten up, the pipe boss is fixed to the plate part. This is the traditional way to do this, without that there have been much considerations and reflections about this way to do it.

When the dimensions become large, such as for subsea pipelines, the costs of the materials begin to matter, but also the weight. With a 22 inch pipe boss, i.e. having a diameter of about 560 mm, the needed raw material blank must have a minimum diameter that is at least as big as the largest diameter of the finished machined pipe boss. When the flange was an integrated part of the pipe boss, the diameter of the blank was naturally determined by the outer diameter of the flange, and large volumes of material needed to be machined away. If the pipe boss had to be delivered in SuperDuplex quality, the material costs are substantial. Also the less expensive variant, pipe boss of F65 steel lined with Inconel, will experience substantial material costs, though not so much as for the first mentioned one. The first step to save stock costs was to produce the blank without the intended traditional flange, only with a smaller edge or mini flange. A separate flange ring should then be used to tighten in the pipe boss. This flange ring was often divided in two halves to enable the assembly.

It has, however, proven that the traditional fixation method, and neither the above described new method, has been sufficient with respect to the high forces and bending moments that arises within this kind of couplings. By a closer study, when a traditional pipe boss is subjected to a pure bending moment, one experiences that the force distribution within the pipe flange itself will be distributed by a compression regime in one half and a tension regime in the other half and with a neutral zone in the transition between the halves. In the half subjected to tension, the tension regime will be at maximum in the middle between the neutral zones and gradually decrease toward the neutral zones. This means that only one bolt, or perhaps two, shall take care of the main share of the occurring tensional forces. The tensional forces of the bending moments act against the bolt heads which in turn create tension within the bolts and pulls them till rupture when the bending moments become too high. It limits itself how many bolts you can have, how close they can be placed and which dimensions they can have.

In installations on the seabed, it is unknown which direction the forces may take, i.e. at where in the flange the largest load occurs. Thus it must to be taken into account that the flange is equally good dimensioned all the way round. When the latter method is to be used, i.e. the one with divided locking ring, predominately the bolts on each side of the partition line will be exposed, if the partition line approximately coincides with the spot where the largest load occurs. The bolts near the partition line will be exposed for extreme tensional forces and are snapped off, and then the next ones are pulled off and so on, until the rupture is complete. The forces of the bending moments are in the order of magnitude 3000 kN in addition to a pure tensile load in the pipe boss of 300 kN. Extremely heavy bolts and of especial quality are necessary to manage such tasks, and they cost correspondingly much. In some situations it will neither be possible to manage this within existing regulations.

The now proposed solution has appeared from the idea that it would have been desirable to find a way how to avoid tensional forces in bolts. If such forces could have been replaced with pure compression forces, much of the problem would have been solved. In addition, it would have been time saving not to assemble the many bolts which must have been installed and tightened.

SUMMARY OF THE INVENTION

This is now solved by the present invention. According to the present invention a locking arrangement of the introductory said kind is provided, which is distinguished in that the arrangement includes two substantially radially extending, when viewed relative to the central axis, action surfaces provided in the external surface of the boss, at least one annular plate formed body made up by individual segments, which at least one annular plate formed body is at its radially inner, but external portion designed to co-operate, or engage with, at least one of the respective two action surfaces, and at its radially outer, but internal portion and on opposite side, abuts the fixed structural part, wherein the thickness of the fixed structural part at the outer portion of the segments plus the thickness of the at least one annular plate formed body at its radially inner portion is approximately equal to the largest distance between the action surfaces and in such a way that a clearance is present in a groove between the boss and the radially inner and internal part of the annular body, i.e. on opposite side of the action surfaces.

Thus, all the forces that may arise in the boss will be handled as compression forces acting directly against the fixed structural part, on the one side or on the other side, all depending on where the bending moment hits and takes place. All aspects of uncertainty, such as tensional forces within bolts, are thus eliminated.

Preferably, each action surface can be in the form of a groove, or a projecting edge or flange having at least one substantially radially extending surface, which radially extending surface constitutes the action surface itself. It is to be understood that if there is a projecting edge or flange, there is only one groove. Alternatively, one may have two grooves and no edge or flange, all what is convenient for the individual application. If there is an edge or flange, the boss will be possible to install in one direction only.

Preferably, a clearance between the projecting edge, or flange, and the structural part is present.

In convenient embodiments, each annular plate formed body is made up by two, three or four segments, possibly more.

Further, each annular plate formed body may in certain circumstances be secured to the fixed structural part by at least one securing means, such as screws, pin bolts and nuts, normally only one or two per segment.

In one embodiment, one of the annular plate formed bodies can, i.e. on one side, be radially locked to the fixed structural part in that the structural part has a groove as the annular body is inserted into and encircled by.

BRIEF DESCRIPTION OF THE DRAWINGS

Other and further objects, features and advantages will appear from the following description of preferred embodiments of the invention, which are given for the purpose of description, and given in context with the appended drawings where:

FIG. 2A shows a cross section view through the pipe boss and the plate part along the line A-A in FIG. 1B, FIG. 2B shows a detail view of the encircled part B in FIG. 2A, FIG. 3 shows a second embodiment of the invention.

DETAILED DESCRIPTION OF THE INVENTION

Figure 1A:
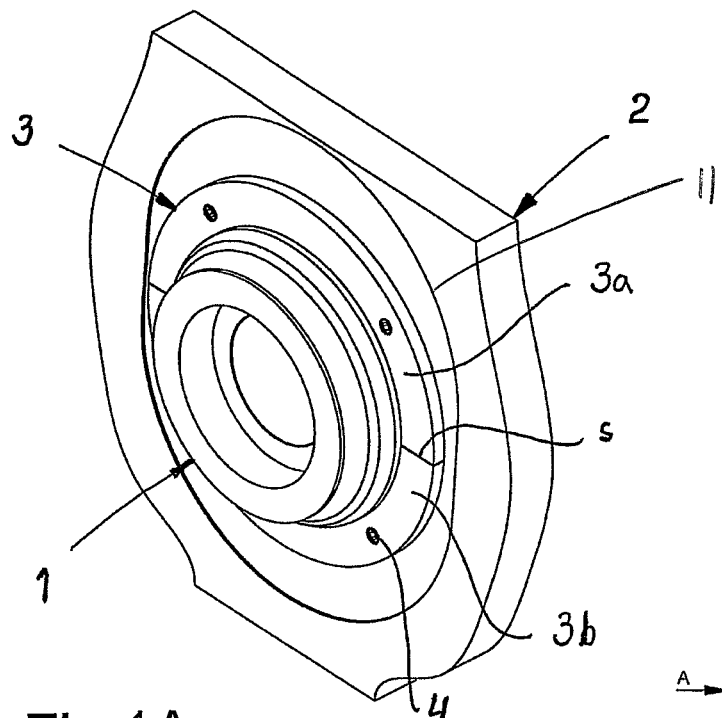
FIG. 1A shows in perspective view a pipe boss secured to a plate part according to the invention.
Figure 1B:
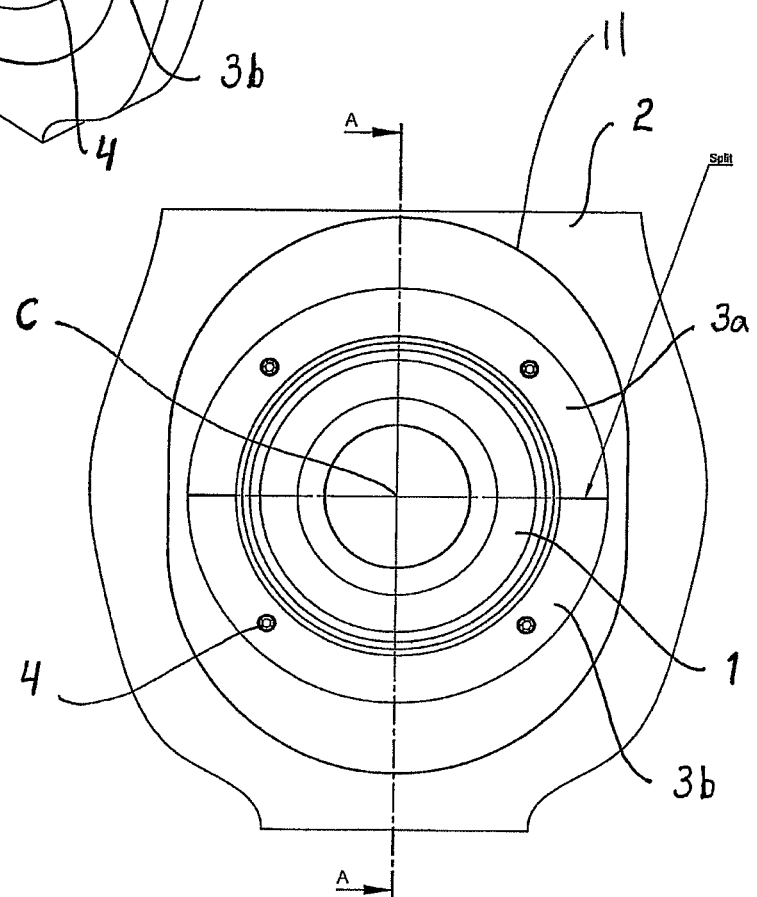
FIG. 1B shows a plan view of the same as is shown in FIG. 1A.

Reference is first made to FIGS. 1A and 1B that schematically show a pipe boss 1 that is secured to, or retained in a structural part 2. For clearness, these parts are entirely isolated from the rest of the structure, such as a connector on the seabed or similar, but such is not shown in the drawings. The pipe boss 1 is retained to the structural part 2 by means of an annular plate formed body 3, here shown made up by two individual segments 3a and 3b having a partition line s (split) there between. Small screws 4 keep the individual segments 3a and 3b in place, but have no load carrying function beyond this. Alternatives to the screws 4 may be fixation means such as pin bolts and nuts. The reference C marks the center line or axis of the pipe boss 1. The centre axis C is substantially perpendicular to the plane of the structural part 2 when the parts are assembled to each other. The number of individual segments 3a, 3b can be two, three, four or more, all according to the need required for each individual application.

Figure 2C:
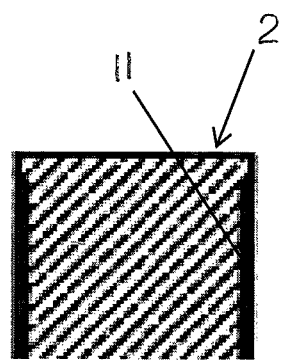
FIG. 2C shows a detail view of the encircled part C in FIG. 2A.

With reference to FIGS. 2A and 2B, the arrangement is now described in closer detail. FIG. 2A is a section along line A-A in FIG. 1B. FIGS. 2A and 2B show an embodiment where the boss 1 is designed with two grooves 5, 5' in its external surface 1a. Each groove 5, 5' includes one, when viewed relative to the central axis C, substantially radially extending action surface. The action surfaces are marked with "A", respectively "B", in upper or lower half, but diagonally relative to each other (marked Contact point A, B in FIG. 2A). The symbols A and B have something to do with the forces that are acting, and this is more closely described and explained below under "theory" about the locking arrangement according to the invention.

As mentioned, each annular plate formed body 3 is made up by individual segments 3a, 3b. Each annular plate formed body 3 is in its radially inner, but external portion 3c designed to engage with, or co-operate with, at least one of the respective said two action surfaces A, B. Further, each annular plate formed body 3 abuts at its radially outer, but internal portion 3d, and thus on opposite side of the action surfaces A, B, against the fixed structural part 2.

In order to achieve intended effect with the locking arrangement according to the invention, the thickness of the fixed structural part 2 at the outer portion 3d of the annular body 3, plus the thickness of the at least one annular plate formed body 3 at its radially inner portion 3c, needs to be approximately equal with the largest distance between the action surfaces A, B, and in such a way that a clearance CL exists in the grooves 5, 5' between the boss 1 and the radially inner and internal portion 3e of the annular body 3, i.e. on opposite side of the action surfaces A, B.

The theory behind the locking arrangement will now be explained with particular reference to FIGS. 2A and 2B. When the boss 1 is subjected to a bending moment, such as the thick black arrow P illustrates, the following force regime takes place. When the upper half of the arrow P represents compression forces, the lower part of the arrow P will represent tensional forces, and vice versa. When the upper half of the arrow P represents compression forces, this results in that at the upper contact point A, the compression forces are transferred from the action surface A in the groove 5' in the pipe boss 1 to the fixed structural part 2 via the annular plate formed body 3, or more precisely the upper segment 3a' on this side. At the upper contact point B, i.e. on opposite side of A, due to the clearance CL, no forces will be transferred and the annular plate formed body 3, i.e. the upper segment 3a on this side, remains substantially unloaded.

In turn, this further results in that at the lower contact point A compression forces are transferred from the action surface A in the groove 5 in the pipe boss 1 to the fixed structural part 2 via the annular plate formed body 3, i.e. more precisely the lower segment 3b on this side. At the lower contact point B, i.e. on opposite side of A, due to the clearance CL, no forces will be transferred and the annular plate formed body 3, i.e. the lower segment 3b' on this side, remains substantially unloaded.

If the main forces change direction, i.e. the lower part of the arrow P represents compression forces, the force regime will be inverted to what is explained above. It is therefore to be emphasized that irrespective of what direction the forces have, all loads are taken up as compression forces. Thus bolts as fixation means can be omitted, and the risk for bolts that are pulled or stretched off are no longer present. All conceivable loads are transformed into compression forces, which will represent a great improvement regarding safety.

It is to be understood that on one side one of the annular plate formed bodies 3 can be radially locked to the fixed structural part 2 in that the structural part 2 has a radially recessed groove 11 (see FIGS. 1A, 1B and 2C), into which the annular body 3 is inserted and is encircled by. When the annular body 3 on the other side is put in place, the annular body 3 on the other side will not have any possibility to escape, i.e. escape from the recessed and encircling groove.

FIG. 3 shows a second embodiment of the invention. As before, a pipe boss 10 is shown retained in a structural part 20 and is totally isolated from the remainder of a construction, such as a connector or similar. Such is not shown in the drawings. The pipe boss 10 is retained to the structural part 20 by means of an annular plate formed body 30, here shown as made up by two individual segments 30a and 30b and has as before a partition line between them. Small screws 40 keep the individual segments 30a, 30b in place, but have no load carrying function beyond this. Alternatives to the screws 40 can be other fixation means such as pin bolts and nuts. The reference C0 marks the center line or axis of the pipe boss 10. The centre axis C0 is substantially perpendicular to the plane of the structural part 20 when the parts are assembled to each other. The number of individual segments 30*a*, 30*b* can be two, three, four or more, all according to the need required for each individual application.

The locking arrangement is now such designed that each action surface is part of one single groove 50 and one single projecting edge or flange 60. Both the groove 50 and the flange 60 have their substantially radially extending surface where this surface itself constitutes the action surface.

It is to be noticed that a clearance CL' is present, firstly between the inner side of the groove 50 and the inner side og the annular body 30, and secondly between the projecting edge or flange 60 and the structural part 20, even if the latter is small, but sufficient to assemble the parts together without pinching. Otherwise the theory is like the one described in connection with FIG. 2A, with the difference that the one annular body 3 now is replaced by a flange or edge 60. This flange 60 results in that the boss 1 only can be mounted into the structural part 20 from one side.

The invention claimed is:

1. A boltless locking arrangement for secure attachment of a boss to a fixed structural part, said boss having a central axis and is extending substantially perpendicular to the plane of the fixed structural part when the parts are assembled, the boltless locking arrangement comprising:
   two substantially radially extending, when viewed relative to the central axis, action surfaces provided in an external surface of the boss;
   at least one annular plate formed body made up by individual segments, said at least one annular plate formed body including a first annular surface immediately facing the fixed structural part when the parts are assembled, and a second annular surface opposite to the first annular surface,
   wherein the second annular surface includes an engaging surface, at a radially inner portion thereof when viewed relative to the central axis, engaging with a respective one of said two action surfaces, and the first annular surface includes an abutting surface, at a radially outer portion thereof when viewed relative to the central axis, abutting the fixed structural part,
   wherein each of said two substantially radially extending action surface is formed by a first side wall defining a recess recessed radially inwardly from the external surface of the boss toward the central axis of the boss, said recess is further defined by a second side wall, opposite to the first side wall, and a clearance is present between the first annular surface at a portion that is radially inward of said abutting surface, and the second side wall.

2. The locking arrangement according to claim 1, wherein each action surface is in the form of a groove, or a projecting edge or flange having at least one substantially radially extending surface, which radially extending surface constitutes the action surface itself.

3. The locking arrangement according to claim 2, wherein a clearance between the projecting edge, or flange, and the fixed structural part is present.

4. The locking arrangement according to claim 3, wherein each annular plate formed body is made up by two, three or four segments.

5. The locking arrangement according to claim 3, wherein each annular plate formed body is secured to the fixed structural part by at least one securing means including screws, pin bolts and nuts.

6. The locking arrangement according to claim 3, wherein the fixed structural part includes a recessed groove to receive the at least one annular plate formed body, the at least one annular plate formed body being radially locked to the fixed structural part.

7. The locking arrangement according to claim 2, wherein each annular plate formed body is made up by two, three or four segments.

8. The locking arrangement according to claim 2, wherein each annular plate formed body is secured to the fixed structural part by at least one securing means including screws, pin bolts and nuts.

9. The locking arrangement according to claim 2, wherein the fixed structural part includes a recessed groove to receive the at least one annular plate formed body, the at least one annular plate formed body being radially locked to the fixed structural part.

10. The locking arrangement according to claim 1, wherein each annular plate formed body is made up by two, three or four segments.

11. The locking arrangement according to claim 10, wherein each annular plate formed body is secured to the fixed structural part by at least one securing means, including screws, pin bolts and nuts.

12. The locking arrangement according to claim 10, wherein the fixed structural part includes a recessed groove to receive the at least one annular plate formed body, the at least one annular plate formed body being radially locked to the fixed structural part.

13. The locking arrangement according to claim 1, wherein each annular plate formed body is secured to the fixed structural part by at least one securing means including screws, pin bolts and nuts.

14. The locking arrangement according to claim 13, wherein the fixed structural part includes a recessed groove to receive the at least one annular plate formed body, the at least one annular plate formed body being radially locked to the fixed structural part.

15. The locking arrangement according to claim 1, wherein the fixed structural part includes a recessed groove to receive the at least one annular plate formed body, the at least one annular plate formed body being radially locked to the fixed structural part.

* * * * *